(12) United States Patent
Jensen

(10) Patent No.: US 6,306,447 B1
(45) Date of Patent: Oct. 23, 2001

(54) INTEGRATED EMULSIFIER AND EDIBLE FIBER

(75) Inventor: Bent Jensen, Agerdrup (DK)

(73) Assignee: Danisco A/S, Copenhagen (DK)

( * ) Notice: Subject to any disclaimer, the term of this patent is extended or adjusted under 35 U.S.C. 154(b) by 0 days.

(21) Appl. No.: 09/617,329

(22) Filed: Jul. 17, 2000

Related U.S. Application Data

(60) Provisional application No. 60/159,047, filed on Oct. 12, 1999.

(51) Int. Cl.[7] ............................... A21D 2/16; A21D 2/18; A23L 1/035
(52) U.S. Cl. ............................ 426/98; 426/293; 426/305; 426/443; 426/654
(58) Field of Search ................................ 426/293, 96, 98, 426/305, 654, 443

(56) References Cited

U.S. PATENT DOCUMENTS

| | | | |
|---|---|---|---|
| 4,178,393 | 12/1979 | Gregersen | 426/635 |
| 4,237,170 | * 12/1980 | Satin | 426/21 |
| 4,565,702 | * 1/1986 | Morley et al. | 426/93 |
| 4,933,192 | 6/1990 | Darling et al. | 426/98 |
| 5,023,103 | * 6/1991 | Ramaswamy | 426/626 |
| 5,250,308 | * 10/1993 | Alexander et al. | 426/94 |
| 5,437,885 | * 8/1995 | Lusas et al. | 426/302 |
| 5,476,678 | * 12/1995 | Walter et al. | 426/660 |
| 5,658,609 | 8/1997 | Abboud et al. | 426/609 |
| 5,747,093 | * 5/1998 | Kaczmarczyk | 426/617 |
| 5,976,598 | * 11/1999 | Akkaway et al. | 426/496 |

FOREIGN PATENT DOCUMENTS

| | | |
|---|---|---|
| 0 153 870 | 9/1985 | (EP) . |
| 1062423 | 3/1967 | (GB) . |
| 1082283 | 9/1967 | (GB) . |
| 1153623 | 5/1969 | (GB) . |
| 1319825 | 6/1973 | (GB) . |
| 2 335 433 | 9/1999 | (GB) . |
| WO 95/20328 | 8/1985 | (WO) . |

* cited by examiner

*Primary Examiner*—Nina Bhat
(74) *Attorney, Agent, or Firm*—Frommer Lawrence & Haug; Thomas J. Kowalski

(57) ABSTRACT

Composition: There is provided a process for the preparation of composition including at least one emulsifier and at least one edible fiber, the process including i) providing an initial composition comprising the emulsifier in a melted form and the edible fiber, ii) spray crystallizing the initial composition such that the emulsifier crystallizes and the emulsifier and the edible fiber are integrated.

17 Claims, No Drawings

INTEGRATED EMULSIFIER AND EDIBLE FIBER

RELATED APPLICATIONS

This application claims priority from each of UK application Ser. No 9916905.4 and U.S. provisional application Serial No. 60/159,047, filed respectively on Jul. 19, 1999 and Oct. 12, 1999. Each of these applications, and each document cited or referenced in each of these applications ("appln cited documents") and each document cited or referenced in this text ("herein cited documents") and each document referenced or cited in each of the appln cited documents and in each of the herein cited documents, are hereby incorporated herein by reference.

FIELD OF THE INVENTION

The present invention relates to an integrated composition comprising an emulsifier and an edible fibre.

BACKGROUND

Integrated blends of emulsifiers and additional components such as stabilisers are known in the art. For example GB-A-1082283 (to a predecessor of the present applicant) relates to a particulate combined emulsifier and stabiliser composition. The composition is used in the preparation of edible and drinkable products.

GB-A-1082283 addresses the problems of providing mixtures of emulsifier and stabiliser. GB-A-1082283 discusses that emulsifier and stabilisers are commonly used in the production of foodstuffs, either alone or in combination. It is described that emulsifiers alone may give an unsatisfactory effect and therefore fail to form a satisfactory dispersion, emulsion or suspension. It is described that stabilisers are generally hydrophilic. On hydration prior to dispersion/ dissolution in aqueous media, it is often found that stabilisers have a tendency to form lumps. This tendency to form lumps has been addressed by the use of wetting agents or suspension of the stabilisers in anhydrous organic liquids such as ethyl alcohol. Both of these proposed solutions are discussed as being disadvantageous.

GB-A-1082283 also describes how combinations of stabiliser and emulsifier have previously been provided in the form of a simple mixture of the two components. However, separation may occur in transit resulting in the problems of the individual components previously discussed and, in addition, incorrect dosing on use because of variation in the amounts of the components within a given batch.

GB-A-1082283 addresses the problems discussed by providing a particulate combined emulsifier and stabiliser composition. The composition is provided in an integrated (encapsulated) form to make the powder composition more convenient for use. GB-A-1082283 teaches that the combined system may be obtained by spray-drying, although drying on belts or drums is also envisaged.

The products of GB-A-1082283 have been used in the industry for the preparation of highfat cakes. In highfat cakes the whipability of the cake batter is not critical.

Whilst the teachings of GB-A-1082283 have been useful in the provision of stabiliser and emulsifier to foodstuffs, there is a desire to provide a stabiliser and emulsifier combination which provides further improved properties of foodstuffs or which may be readily used in low fat products, such as low fat bakery products.

The supply of stabiliser/emulsifier combinations has also been achieved by the provision of cake gels and cake hydrates. These systems have a number of well recognised disadvantages. They are inconvenient to use and may require preparation by the end user (this involves hydration and subsequent handling of a greasy gels). Moreover, the shelf life of bakery products prepared with such systems, such as cakes, is rather short. Yet further disadvantages include the limited possibilities of modifying cake texture and surface, no possibility of adding extra water to the cake recipe and it is not possible to use them in a full cake mix.

Powdered sponge improvers have also been provided. However, like cake gels and cake hydrates, the shelf life of bakery products, such as cakes, prepared with such systems is rather short. Moreover, there are limited possibilities of modifying cake surface and texture and there a limited possibility of adding extra water to the cake recipe.

Systems comprising emulsifiers integrated with additional components are know in the art. For example, GB-A-1062423 discloses the integration of cellulose, a non-dietary fibre, and an emulsifier. The components are integrated by methods such as spray drying.

EP-A-0153870 relates to a powder product comprising one or more surface-active substances applied on a carrier. The carrier may be selected from bran products such as beanbran. The surface active material may be an emulsifier. A product is obtained by extrusion of the surface-active substance and carrier.

WO-A-95/20328 teaches a composite of a particulate cellulose and one or more surfactants such as an emulsifier absorbed onto the surface of this cellulose.

U.S. Pat. No. 5658609 relates to a fat replacer system using an emulsifier and in one alternative a vegetable fibre. The system is prepared by spray drying the components together.

OBJECTS AND SUMMARY OF THE INVENTION

An object of the present invention can be to alleviate problem(s) of the prior art.

In one aspect the present invention provides a process for the preparation of composition comprising at least one emulsifier and at least one edible fibre, the process comprising i) providing an initial composition comprising the emulsifier in a melted form and the edible fibre, ii) spray crystallising the initial composition such that the emulsifier crystallises and the emulsifier and the edible fibre are integrated.

By the term "integrated" it is meant that at least some particles of the composition of tie present invention comprise both the emulsifier and the edible fibre. Preferably by the term it is meant that the edible fibre is encapsulated by the emulsifier.

The term "edible fibre" is commonly used in the art and is analogous to the term "dietary fibre". By the term "edible fibre" it is meant the edible parts of plants, or analogous carbohydrates, that are resistant to digestion and absorption in the human small intestine with complete or partial fermentation in the large intestine. This is the consensus definition of the American Association of Cereal Chemists (AACC) Dietary Fibre Definition Committee.

Emulsifiers used in the preparation of products such as whipped products are generally in the α-crystal form, which facilitates the uptake of water in to the composition. When the composition is contacted with water the emulsifier quickly brings the water into the composition. It is generally understood that spray dried emulsifier products are able to provide emulsifier in the α-crystal form. This is because spray-drying retains emulsifier provided in the α-crystal form predominantly in that form. In view of this understanding in the art prior art systems have typically used spray drying to produce an integrated system. A significant disadvantage of using spray drying however is that large amounts of water or other solvents are removed from the composition during the drying process. The removal of water/solvent is at a substantial energy cost. A further significant disadvantage is that spray crystallisation requires the addition to the composition to be sprayed of a carrier material. This material, which does not add to the functionality to the final product, adds to production and transport costs. Moreover, the carrier material, if incorporated in a final food product may have to be declared as an additive in an ingredients list.

It has been surprisingly found that by spray crystallising the initial composition an integrated composition is obtained in which channels are formed in the emulsifier. When contacted with water, the water will access this channel system. These channels allow for improved ingress of the water into the integrated composition. The improved ingress provides more rapid disintegration of the product and improved functional properties. This result is surprising and allows for the provision of an integrated product which has acceptable disintegration properties yet does not require production by energy consuming techniques such as spray drying.

The spray crystallised products of the present invention provide further advantages. Spray crystallisation provides particles which are more uniform and generally more spherical in shape than particles produced by alternative methods. These more regular and more spherical particles have improved flow properties compared to the alternatively produced products. In particular extruded products provide irregular or jagged particles. Such particles have poor flow properties. Moreover, spray crystallisation allows for the production of particles larger than those which may be provided by spray drying. For example, spray crystallisation may provide particles with an average diameter of 500 to 800 μm. Larger particles generally speaking have improved flow properties and produce less dust on handling.

The present invention provides an integrated composition comprising an emulsifier and an edible fibre. For example, the edible fibre is encapsulated by the emulsifier. The blend may be used in the production of cakes, in particular for whipped sponge low-fat sponge cake. Integrating the edible fibre and the emulsifier using spray crystallisation, may improve the whipability of products prepared with the emulsifier by approximately up to 40%.

Preferably the initial composition of the process of the present invention is substantially flee of free water.

By the term "free water" it is meant water which is not incorporated within one of the constituents of the initial composition. For example, water may be present in the edible fibre of the present invention. This is not free water.

By the term "substantially free of free water" it is meant having a free water content of preferably less than 20 wt %, preferably less than 15 wt %, preferably less than 10 wt %, preferably less than 5 wt %, preferably less than 2 wt %, more preferably less than 1 wt %, more preferably less than 0.5 wt %, yet more preferably less than 0.1 wt %.

In contrast to the present invention spray drying of compositions is always performed in the presence of free water, for example a free water content of 40–98 wt %.

In a further aspect of the present invention, the initial composition consists essentially of the emulsifier and the edible fibre.

The composition of the present invention may be used in the preparation of a variety of foodstuffs. Foodstuffs include bakery products prepared from bakery batters such as cake batters and whipping systems such as toppings, whipping agents for creams.

The composition of the present invention may be in the form of a free-flowing non-dusty powder which consists of small uniform beads. The flowability of the composition may be improved by the addition of anti-caking agent. The emulsifier part imparts a good whipability to the batter.

Water loss during baking of a product of the present invention is reduced, resulting in a higher water content of the finished cake. It has been identified that this provides a prolonged shelf life. It has been found that when compared to prior art systems, the emulsifier and fibre composition of the present invention, the shelf life of Swiss rolls may be prolonged from 12 days to at least 21 days, and may be up to 1 month.

It is also found that the composition of the present invention gives resilience to a cake. This is particularly advantageous in cakes which are manipulated after baking. For example the present composition may improve the rollability of a Swiss roll without breaking.

DETAILED DESCRIPTION

As discussed above the present invention relates to a process for the preparation of composition comprising at least one emulsifier and at least one edible fibre, the process comprising i) providing an initial composition comprising the emulsifier in a melted form and the edible fibre, ii) spray crystallising the initial composition such that the emulsifier crystallises and the emulsifier and the edible fibre are integrated.

Fibre

The term edible fibre includes polysaccharides, oligosaccharides, lignin and associated plant substances.

Preferably the edible fibre is selected from sugar beet fibre, apple fibre, pea fibre, wheat fibre,, oat fibre, barley fibre, rye fibre, rice fibre, potato fibre, tomato fibre, other plant non-starch polysaccharide fibres, and combinations thereof More preferably the edible fibre comprises at least sugar beet fibre.

Emulsifier

Preferably the emulsifier of the composition of the present invention is selected from propylene glycol monostearate (PGMS), sodium stearoyl lactylate (SSL), calcium stearoyl lactylate (CSL), monoglycerides, diglycerides, monodiglycerides, polyglycerol esters, lactic acid esters, polysorbate, sucrose esters, diacetyl tartaric acid esters of mono-diglycerides (DATEM), citric acid esters of monoglycerides (CITREM) and combinations thereof.

The emulsifier of the composition of the present invention may also be selected from DIMODAN including DIMODAN® B 727 and DIMODAN® PV, GRINDSTED™ CITREM, GRINDSTED™ GA, GRINDSTED™ PS such as GRINDSTED™ PS 100, GRINDSTED™ PS 200, GRINDSTED™ PS 300, GRINDSTED™ PS 400; RYLO™ (manufactured and distributed by DANISCO CULTOR), including RYLO™ AC, RYLO™ CI, RYLO™ LA, RYLO™ MD, RYLO™ MG, RYLO™ PG, RYLO™ PR, RYLO™ SL, RYLO™ SO, RYLO™ TG; and combinations thereof.

In aspects the emulsifier may be in alpha crystal form or in beta crystal form. When the composition of the present invention is used in a whippable product such as a cake batter, the emulsifier is preferably in alpha crystal form. In this aspect the composition preferably contains propylene glycol monostearate (PGMS), and/or sodium/calcium stearoyl lactylate (C/SSL). When the composition of the present invention is used in a product in which whipability is not required, such as in bread dough, the emulsifier may be in beta crystal form.

The composition may comprise at least two emulsifiers. The composition may comprise three emulsifiers Emulsifer Improver In addition to the emulsifier and the edible fibre, the composition of the present invention may further comprise an emulsifier improver. The emulsifier improver may be incorporated in the initial composition and spray crystallised with the composition or may be added after spray crystallisation of the edible fibre and emulsifier.

By the term "emulsifier improver" it is meant a material which enhances the distribution and/or emulsifying action of an emulsifier when compared to the distribution and/or emulsifying action of the emulsifier in absence of the material.

The emulsifier improver of the present composition may be a swelling improver or a non-swelling improver. By the terms "swelling" and "non-swelling" it is meant the properties of the emulsifier improver on contact of the present composition with water.

The emulsifier improver may be selected from hydrocolloids, fibres, salts, proteins, sugars and combinations thereof.

In one aspect the emulsifier improver is other than a salt alone. In other words, if the emulsifier improver comprises a salt, the improver comprises at least one further improver other than a salt.

In one further aspect when the emulsifier is a distilled monoglyceride, the emulsifier improver is other than calcium propionate alone. In other words, when the emulsifier is a distilled monoglyceride, if the emulsifier improver comprises calcium propionate, the improver comprises at least one further improver other than calcium propionate.

The hydrocolloids may be selected from alginate, carrageenan, carboxymethyl cellulose (CMC), guar gum, locust bean gum (LBG), xanthan gum, microcrystalline cellulose (MCC), methyl cellulose (MC), cellulose ethers including hydroxy propyl methyl cellulose (HPMC), pectin, starch including native and modified starch, pregelatinated starch and non-pregelatinated starch, including starch from corn, potato, tapioca, wheat, and rice, gelatin, agar, and combinations thereof.

The fibres may be selected from the fibres described above.

The salts may be selected from baking powder systems, ammonium carbonate, salts in general including sodium chloride, and combinations thereof.

The proteins may be selected from milk proteins, wheat proteins, pea protein, soy proteins, buckwheat proteins, carob proteins, barley proteins, oat proteins, rice proteins, rye proteins, gelatin, whey proteins, and combinations thereof.

The sugars may be selected from sucrose, lactose, glucose, maltose and combinations thereof.

The composition may comprise from 1 to 3 emulsifier improvers.

It has been identified that specific emulsifier improvers in compositions of the present invention provide particularly advantageous properties. These combinations include, but are not limited to, the emulsifier improver comprising at least pectin and carrageenan, (preferably in a ratio of 20:80 to 40:60, with respect to each other, preferably approximately 30:70)

at least pectin and guar gum (preferably present in a ratio of 30:70 to 70:30 with respect to each other, preferably 40:60 to 60:40, more preferably 45:55 to 55:45)

at least sugar beet fibre at least a baking powder, preferably wherein the baking powder consists of 40–60 wt % di-Na-pyrophosphate, and 40–60 wt % Na-bicarbonate Compositions It is to be appreciated that the product obtainable and/or obtained by the process of the present invention is encompassed by the present invention. Accordingly in further aspects the present invention provides a composition obtainable by the process of the present invention a composition obtained by the process of the present invention The composition of the present invention may be used in the preparation of any number of products, in particular food products such as bakery foodstuffs and whipped foodstuffs. Thus in further aspects, the present invention provides a bakery product comprising or prepared from a composition of the present invention.

a whipped foodstuff comprising or prepared from a composition of the present invention.

Further aspects of the invention include use of a composition for improving the crumb structure of a bakery foodstuff, wherein the composition comprises an emulsifier and an edible fibre which are integrated.

use of a composition for increasing the storage life of a bakery foodstuff, wherein the composition comprises an emulsifier and an edible fibre which are integrated.

use of a composition for increasing the flexibility of a bakery foodstuff, wherein the composition comprises an emulsifier and an edible fibre which are integrated.

It has been found that compositions of the present invention may exhibit one or more of the following advantages is produced by a low energy method has excellent flow properties may improve the whipping effect and thereby the volume of a bakery product such as a baked cake.

is convenient in use since it is a powder product and can be applied in all-in-bakery procedures.

has excellent water binding properties.

provides improved tolerance towards mixer type and mixing time.

can be applied in full foodstuff mixes such as cake mixes.

gives excellent moisture retention during baking.

produce excellent product surface and texture and give many more possibilities of modifying these two parameters than in the prior art systems.

showed excellent stability in full cake mixes, up to at least approximately 1 year.

provides the possibility of adding up to 5% extra water to foodstuff (e.g., cake) recipes.

dramatic prolongation of the shelf life of the baked products, such as cake. Cakes with a shelf life of 2–3 days will easily, by using a composition of the present invention, end with a shelf life of 1–2 weeks. Cakes with a shelf life of 1 week will have an extra 2–3 weeks and cakes with a shelf life of 1 month will have an extra 1–2 months, etc.

excellent resilience in the cakes

Further broad aspects of the present invention include a process for the preparation of composition comprising at least one emulsifier and at least one emulsifier improver, the process comprising i) providing an initial composition comprising the emulsifier in a melted form and the emulsifier improver, ii) cooling the initial composition such that the emulsifier crystallises and the emulsifier and the emulsifier improver are integrated the emulsifier improver is as defined above a composition comprising an emulsifier, pectin and guar gum, wherein the emulsifier, pectin and guar gum are integrated.

a composition comprising an emulsifier, and edible fibre, wherein the emulsifier, and edible fibre are integrated.

a composition comprising an emulsifier, and baking powder, wherein the emulsifier, and baking powder are integrated.

The invention will now be described, by way of example only, with reference to the following Examples.

EXAMPLES

Example 1:

Monoglycerides+SSL+PGMS+Sugar Beet Fibre

A mixture of 70% GRINDSTED™ GA 1350 (monodiglycerides+SSL+PGMS) from Danisco Cultor and 30% Fibrex 595 (sugar beet fibre) from Danisco Sugar AB was prepared. The sugar beet fibres were mixed into the melted emulsifiers and the mix was turned into a fine free-flowing powder by spray crystallisation.

The product was used as whipping agent in a sponge cake recipe with the following composition:

| | |
|---|---|
| Granulated sugar | 208 g |
| Wheat flour | 188 g |
| Corn starch | 60 g |
| Baking powder | 14 g |
| Whole egg | 200 g |
| Water | 150 g |

30 g of the integrated product of the present invention was added to this recipe. The procedure was an all-in procedure i.e. single stage. The batter was whipped for 6 minutes on a Hobart mixer and the batter density was measured.

| | Batter density, g/l |
|---|---|
| Day after production | 298 |

This Example may be compared with Comparative Example 3.

From the batter a sponge cake wag prepared and given the following evaluation:

Surface: nice and smooth, middle brown colour

Crumb: yellowish, homogeneous, coarse structured

Specific volume: 5.95 ml/g.

Furthermore, it was possible to add 1–3% extra water still maintaining the same benefits compared to Comparative Example 3.

Example 2:

DATEM+Sugar Beet Fibre

A mixture of 70% PANODAN™ (DATEM) supplied by Danisco Cultor and 30% Fibrex 595 from Danisco Sugar AB, was prepared. The sugar beet fibre was mixed into the melted DATEM and the mixture was then spray crystallised into a fine free-flowing powder.

The product was tested in a Danish roll procedure and compared with a similar dosage (0.45%) DATEM without sugar beet fibre.

| | Specific bread volume, ccm/g |
|---|---|
| DATEM + sugar beet fibre + 2% extra water | 7.39 |
| DATEM | 6.18 |

The integration of DATEM and sugar beet fibre resulted in a beneficial volume effect. In addition, the integration of DATEM and sugar beet fibre provides the possibility of adding 2% extra water.

Example 3:

Monoglycerides+SSL+PGMS (Comparative)

This example serves as comparison to the previous integrated products. In this example only an emulsifier blend is provided and no emulsifier improver is incorporated in the composition. The example demonstrates, by comparison, the positive effect of the various emulsifier improvers used in the previous examples.

GRINDSTED™ GA 1350 (monodiglycerides+SSL+PGMS) supplied by Danisco Cultor is used in the test. 30 g of the product was applied to the same sponge cake recipe as in Example 1.

| Storage | Batter density, g/l |
|---|---|
| Day after production | 310 |
| After three months | 328 |
| After six months | 342 |
| After nine months | 348 |
| After 12 months | 372 |

Characteristics of sponge cake made from the batter:

Surface: slightly uneven with some bubbles.

Crumb: some tunnels and somewhat non-homogeneous, dries out rather fast Not possible to add extra water This test demonstrates that Examples 1 and 2 are able to achieve the same whipping effect with 13–37% less emulsifier i.e. there is a very significant positive effect from the integrated emulsifier improver(s) on the effect of the emulsifiers.

Furthermore, Example 1 demonstrate the possibility of adding 1–5% extra water still maintaining the same benefits which was not the case for this comparative Example. Also surface and crumb software in this example is inferior compared to Example 1.

Example 4:

Monoglycerides+SSL+PGMS (Comparative)

The product was prepared according to Example 3. However, in this Example the composition was stored together with the other dry ingredients from the cake recipe thereby simulating the conditions for premix products to which only water and egg are added,

| Storage | Batter density, g/l |
|---|---|
| After three months | 335 |
| After six months | 368 |
| After nine months | 380 |
| After 12 months | 382 |

The characteristics of sponge cake made from batter were similar to those of Example 3. The conclusion from this comparison example are in line with those from Example 3.

Example 5:

Integrated Monoglyceride Emulsifier & Functional Ingredient

The following baking experiments were conducted to evaluate the performance of two products. One product was an integrated product in accordance with the present invention. The second product was a comparison comprising a distilled monoglyceride emulsifier, DIMODAN® B 727. The primary goal was to test the product of the present invention versus the product containing DIMODAN® B 727 which is usually used as a bread softener.

To investigate the improvement in softness of crumb structure when an emulsifier such as a distilled monoglyceride is integrated with at least one emulsifier improver by spray crystallisation, the following combinations were prepared by spray crystallisation. The samples were then tested in the preparation of bread.

The product in accordance with the present invention consisted of 35% Fibrex 595 (a sugar beet fibre available from Danisco Sugar AB) and 65% DIMODAN® PV (a distilled monoglyceride emulsifier available from Danisco Cultor, Denmark)

The samples are tested against a control, DIMODAN® B 727 (a distilled monoglyceride emulsifier available from Danisco Cultor, Denmark), in a toast bread recipe below in dosages resulting in the same distilled monoglyceride content in each trial.

| Sample | Composition | Dosage |
|---|---|---|
| 0 | DIMODAN ® B 727 | 0.35% |
| 1 | 35% Fibrex 595 and 65% DIMODAN ® PV | 0.54% |

Recipe

| Ingredients | g |
|---|---|
| Flour | 2000 |
| Dry yeast | 30 |
| Sugar | 30 |
| Salt | 30 |
| Water | to a consistency of 400 BU + 60 g |

Both of the products were applied to dough. The dough was split into 4 parts. The dough samples were then treated and baked as follows.

Three of the four samples were baked in forms with lid and one was baked in a form without lid. Three loaves of bread were used for softness measurements and one bread for volume measurements.

Procedure

Kneading: Hobart, 2+10 min. (depending on flour)
Dough temperature: 24–25° C.
Resting: 10 min. at 30° C.
Scaling: 750 g
Resting: 5 min. at room temperature
Moulding: Glimek 1:4; 2:3,5; 3:14; 4:12 (10 at each side)
Proofing: 50–60 min. at 33° C., 85% RH.
Baking: Bago 1:30 min. at 220° C., 12 see. Steam
Bago 2:30 min. at 220° C., 10 sec. Steam The softness of the crumb structure was measured on a Instron UTM (universal testing machine), available from Instron International Limited, High Wycombe, England, at the following settings:

| | |
|---|---|
| Full scale load | 100 N |
| Crosshead speed | 100 mm/min |
| Anvil height | 14 mm |
| Stress and load are reported at | 25% |
| Test is ended with compression exceeds | 26% |
| Sample dimensions | 1962.5 square mm |
| Statistics printed | mean values, and standard deviations |

Volume is measured on Volumeter, type LB size Volumeter 1675–3000cc.

| | |
|---|---|
| Sample 1 | Specific Volume |
| Sample 2 | Softness after 1 day resting time |
| Sample 3 | Softness after 3 days resting time |
| Sample 4 | Softness after 7 days resting time |

The data are given in the Table below.

| DAY | TIME | MIX | TRT | SPVOL | SOFT1 | SOFT3 | SOFT7 |
|---|---|---|---|---|---|---|---|
| 1 | 1 | 1 | 1 | 4.37 | 24 | 42 | 81 |
| 1 | 2 | 3 | 0 | 4.05 | 30 | 56 | 88 |
| 1 | 3 | 1 | 0 | 4.04 | 28 | 58 | 89 |
| 1 | 3 | 2 | 0 | 4.09 | 31 | 52 | 84 |
| 1 | 3 | 3 | 0 | 4.15 | 27 | 47 | 79 |
| 1 | 4 | 1 | 1 | 4.15 | 27 | 50 | 83 |
| 2 | 1 | 2 | 0 | 4.29 | 26 | 45 | 79 |
| 2 | 2 | 1 | 0 | 4.32 | 23 | 47 | 85 |
| 2 | 2 | 3 | 1 | 4.41 | 24 | 49 | 74 |
| 2 | 4 | 1 | 0 | 4.42 | 25 | 54 | 92 |
| 2 | 4 | 2 | 0 | 4.4 | 23 | 57 | 92 |
| 3 | 1 | 2 | 0 | 4.12 | 30 | 53 | 81 |
| 3 | 1 | 3 | 0 | 4.4 | 27 | 54 | 81 |
| 3 | 2 | 3 | 0 | 4.21 | 28 | 49 | 73 |
| 3 | 3 | 2 | 1 | 4.49 | 24 | 48 | 72 |
| 3 | 4 | 1 | 0 | 3.81 | 30 | 62 | 96 |

The following notation have been used:
'DAY' denotes the baking-day;
'TIME' denotes time within the baking-day;
'MIX' denotes the mixer;
'TRT' denotes the treatments (the control is denoted as 0 and the treatments in accordance with the present invention is denoted 1).

DISCUSSION

Based on the results it can be concluded that there is not a significant difference in volume between the different samples.

As regards softness some of the samples of compositions in accordance with the present invention result in significantly lower values (improved softness) compared to the control. On day 7 after baking sample the sample of the present invention resulted in significantly softer bread compared to control.

An integrated composition in accordance with the present invention comprising Fibrex 595 in combination with a distilled monoglyceride emulsifier (DIMODAN® PV) results in an improved effect of the distilled monoglyceride emulsifier.

The differences in the softness measurements on the Instron are in the ratio 8–10 hPa; the lowest values are approx. 75 hPa and the highest values are approx. 85 hPa.

One may conclude that an integrated composition comprising an emulsifier and an edible fibre in accordance with the present invention such as Fibrex 595 (35% Fibrex 595) provides an improved effect of DIMODAN® PV when compared to application of the other ingredients used as carrier.

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry or related fields are intended to be within the scope of the following claims.

What is claimed is:

1. A process for the preparation of composition comprising at least one emulsifier and at least one edible fibre, the process comprising
   i) providing an initial composition comprising the emulsifier in a melted form and the edible fibre,
   ii) spray crystallising the initial composition such that the emulsifier crystallises and the emulsifier and the edible fibre are integrated.

2. A process according to claim 1 wherein the emulsifier is selected from propylene glycol monostearate (PGMS), sodium stearoyl lactylate (SSL), calcium stearoyl lactylate (CSL), monoglycerides, diglycerides, monodiglycerides, polyglycerol esters, lactic acid esters, polysorbate, sucrose esters, diacetyl tartaric acid esters of mono-diglycerides (DATEM), citric acid esters of monoglycerides (CITREM) and combinations thereof.

3. A process according to claim 1 wherein the edible fibre is selected from sugar beet fibre, apple fibre, pea fibre, wheat fibre, oat fibre, barley fibre, rye fibre, rice fibre, potato fibre, tomato fibre, other plant non-starch polysaccharide fibres, and combinations thereof.

4. A process according to claim 1 wherein the edible fibre comprises at least sugar beet fibre.

5. A process according to claim 1 wherein the initial composition is substantially free of free water.

6. A composition obtainable by the process of claim 1.

7. A bakery product comprising or prepared from a composition as defined in claim 6.

8. A whipped foodstuff comprising or prepared from a composition as defined in claim 6.

9. A method for improving the crumb structure of a bakery foodstuff, comprising preparing the bakery foodstuff with a composition comprising at least one emulsifier and at least one edible fibre which are integrated, wherein the composition is prepared by a process comprising (i) providing an initial composition comprising the emulsifier in a melted form and the edible fibre, and (ii) spray crystallising the initial composition such that the emulsifier crystallises and the emulsifier and edible fibre are integrated.

10. The method according to claim 9 wherein the emulsifier is selected from the group consisting of: propylene glycol monostearate (PGMS), sodium stearoyl lactylate (SSL), calcium stearoyl lactylate (CSL), monoglycerides, diglycerides, monodiglycerides, polyglycerol esters, lactic acid esters, polysorbate, sucrose esters, diacetyl tartaric acid esters of mono-diglycerides (DATEM), citric acid esters of monoglycerides (CITREM) and combinations thereof.

11. The method according to claim 9 wherein the edible fibre is selected from the group consisting of: sugar beet fibre, apple fibre, pea fibre, wheat fibre, oat fibre, barley fibre, rye fibre, rice fibre, potato fibre, tomato fibre, other plant non-starch polysaccharide fibres, and combinations thereof.

12. A method for increasing the storage life of a bakery foodstuff, comprising preparing the bakery foodstuff with a composition comprising at least one emulsifier and at least one edible fibre which are integrated, wherein the composition is prepared by a process comprising (i) providing an initial composition comprising the emulsifier in a melted form and the edible fibre, and (ii) spray crystallising the initial composition such that the emulsifier crystallises and the emulsifier and edible fibre are integrated.

13. The method according to claim 12 wherein the emulsifier is selected from the group consisting of: propylene glycol monostearate (PGMS), sodium stearoyl lactylate (SSL), calcium stearoyl lactylate (CSL), monoglycerides, diglycerides, monodiglycerides, polyglycerol esters, lactic acid esters, polysorbate, sucrose esters, diacetyl tartaric acid esters of mono-diglycerides (DATEM), citric acid esters of monoglycerides (CITREM) and combinations thereof.

14. The method according to claim 12 wherein the edible fibre is selected from the group consisting of: sugar beet fibre, apple fibre, pea fibre, wheat fibre, oat fibre, barley fibre, rye fibre, rice fibre, potato fibre, tomato fibre, other plant non-starch polysaccharide fibres, and combinations thereof.

15. A method for increasing the flexibility of a bakery foodstuff, comprising preparing the bakery foodstuff with a composition comprising at least one emulsifier and at least one edible fibre which are integrated, wherein the composition is prepared by a process comprising (i) providing an initial composition comprising the emulsifier in a melted form and the edible fibre, and (ii) spray crystallising the initial composition such that the emulsifier crystallises and the emulsifier and edible fibre are integrated.

16. The method according to claim 15 wherein the emulsifier is selected from the group consisting of: propylene glycol monostearate (PGMS), sodium stearoyl lactylate (SSL), calcium stearoyl lactylate (CSL), monoglycerides, diglycerides, monodiglycerides, polyglycerol esters, lactic acid esters, polysorbate, sucrose esters, diacetyl tartaric acid esters of mono-diglycerides (DATEM), citric acid esters of monoglycerides (CITREM) and combinations thereof.

17. The method according to claim 15 wherein the edible fibre is selected from the group consisting of: sugar beet fibre, apple fibre, pea fiber, wheat fibre, oat fibre, barley fibre, rye fibre, rice fibre, potato fibre, tomato fibre, other plant non-starch polysaccharide fibres, and combinations thereof.

\* \* \* \* \*